US006566439B2

(12) United States Patent
Samukawa

(10) Patent No.: US 6,566,439 B2
(45) Date of Patent: May 20, 2003

(54) LOWLY-ADHESIVE COATING MATERIAL

(75) Inventor: Hiroshi Samukawa, Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/497,477

(22) Filed: Feb. 4, 2000

(65) Prior Publication Data

US 2003/0049441 A1 Mar. 13, 2003

(51) Int. Cl.$^7$ ............................. C08L 33/08; C08L 33/10
(52) U.S. Cl. ......................... 524/533; 524/535
(58) Field of Search ................... 524/533, 535; 428/352, 354, 40.7, 41.3, 41.5, 41.8

(56) References Cited

U.S. PATENT DOCUMENTS 3,975,352 A * 8/1976 Yoerger et al. ......... 260/33.8 F
4,513,059 A * 4/1985 Dabroski .................. 428/355
5,804,674 A * 9/1998 Yamana et al. ............. 525/477

FOREIGN PATENT DOCUMENTS

| EP | 0705671 A1 * | 4/1996 | ........... B29C/33/60 |
| JP | 59-22983 | 2/1984 | |
| JP | A-3-40754 | 2/1991 | |
| JP | A-3-258863 | 11/1991 | |
| WO | 95/00307 | 1/1995 | |

* cited by examiner

Primary Examiner—James J. Seidleck
Assistant Examiner—Melanie Bissett
(74) Attorney, Agent, or Firm—Oliff & Berridge, PLC

(57) ABSTRACT

The present invention provides a lowly-adhesive coating material comprising 99 to 33% by weight of a fluorine-containing acrylic polymer obtained by polymerizing a monomer composition mainly comprising acrylate or methacrylate having $C_{6-16}$ perfluoroalkyl groups and 1 to 67% by weight of a fluorine-type oil.

3 Claims, No Drawings

LOWLY-ADHESIVE COATING MATERIAL

BACKGROUND OF THE INVENTION

1. Technical Field of the Invention

The present invention relates to lowly-adhesive coating materials used upon formation of a releasing liner for adhesive materials, upon treatment of the backside of a single-sided tape, upon oil- and dirt-preventing treatment of electronic parts, etc. and, more particularly, it relates to lowly-adhesive coating materials for precision electronic instruments which are required to contain no silicone.

2. Related Art of the Invention

Usually, adhesive tapes are composed of a substrate and an adhesive layer provided thereon, and are traded in a rolled state and used while being rewound. In such an adhesive tape, a releasing liner for adhesive materials is allowed to temporarily adhere to the adhesive surface of the adhesive tape, in order to prevent the surface carrying an adhesive from strongly adhering to the backside carrying no adhesive agent and then make easy the rewinding upon use.

As the releasing liner for adhesive materials, there has been used in general a coat of polydimethylsiloxane. This is because 1) a force (releasing force) necessary for releasing the adhered releasing liner from the adhesive surface is small; 2) its stability against aging is good; and 3) its production cost is relatively low.

Recently, however, problems due to a silicone pollution have been highlighted in precision electronic instruments and there is a tendency that releasing liners of a silicone type are not preferred. Thus, it is believed that, if and when polydimethylsiloxane causes a pollution in the instruments via some routes, polydimethylsiloxane is decomposed by electric energy which is generated during the operation of the electronic instruments to form solid particles of silicon dioxide, and the resulting particles are precipitated in fine spaces in a driving system of the electronic instruments, whereby operation of the driving system is disturbed and scratches are generated. Particularly, in the case of the instruments equipped with a hard disk as recording mediums, they are very sensitive to this problem because of high airtightness, of a short distance between the recording head and the disk due to high density and also of a rotation of the disk in a high speed. Accordingly, there has been a demand for the non-use of silicone not only for the materials of the parts which directly constitute the electronic instruments but also for the indirect materials which contact with the electronic parts, in order to prevent transfer pollution of silicone from the materials used. There has been a demand for the non-use of silicone for a releasing liner for adhesive materials as well.

With regard to a releasing agent which forms a releasing liner for adhesive materials of a non-silicone type, agents of a non-fluorine-type and of a fluorine-type are available and, with respect to the agent of a non-fluorine-type, that of an alkyl pendant type and of a condensed wax type (refer to "Nenchaku Handobukku" (Handbook of Adhesion), pages 163–171) have been known. All of them have a releasing force in a medium degree of around 2 to 10 N/dm as compared with the pressure-sensitive adhesive agent of an acrylic type having a strong cohesive force and are difficult to give a light releasing force which is preferred in the market, i.e., 0.2 to 2 N/dm.

On the other hand, a fluorine-containing acrylic polymer has been known as a releasing agent of a fluorine-type. The fluorine-containing acrylic polymer gives a releasing force of 2 to 4 N/dm if well-designed, but that is still heavy as compared with the releasing force which has been demanded in the market. There is another inconvenience that the fluorine-containing acrylic polymer has a strong tendency of a stick-slip upon releasing.

As to a releasing agent of a fluorine-type, that which is mainly composed of a perfluoropolyether has been known (see Japanese Patent Application Laid-open No. 3-258863, Claims). Although such a releasing agent gives a sufficiently light releasing property, that agent is disadvantageous in view of cost since a perfluoropolyether is very expensive. In addition, in a production process of a releasing liner for adhesive materials from this releasing agent, the releasing agent is applied on a substrate and the resulting coat is hardened to form the releasing liner, where during the hardening stage it is necessary to conduct a UV irradiation in an inert gas. Accordingly this process is very troublesome as compared with the common solvent coating method. Moreover, adhesion between the substrate and the releasing liner is insufficient. With regard to a method for improving the adhesion therebetween, there is a proposal that a primer mainly comprising a special acrylic monomer which is copolymerizable with a perfluoropolyether is previously coated on the substrate (Japanese Patent Application Laid-open No. 3-40754 and U.S. Pat. Nos. 4,567,073 and 4,614,667). However according to this proposal, the production process for a releasing liner for adhesive materials becomes more troublesome, resulting in a high cost.

SUMMARY OF THE INVENTION

Against the problems in the above-mentioned prior art, objects of the present invention is that a coat of a non-silicone type can be easily formed only by applying a coating solution to a substrate followed by drying; that, although the coat shows a sufficient adhesion to the substrate, it shows a releasing property of at least medium degree or, preferably, a releasing property of as light as not more than 2 N/dm to the adhesive layer of pressure-sensitive adhesive agent of an acrylic type having a strong adhesive property; that the stability of a releasing force against aging is made good; and that the adhesive layer which has been stuck to the coat and then released therefrom is made to possess the same adhesive force as before.

The present inventor has found that a coating material prepared by compounding a specific fluorine-containing acrylic polymer with a fluorine-type oil in a specific ratio has features that a coat prepared from the coating material shows a little releasing force to an adhesive layer whereby a tendency of stick-slip upon releasing is reduced and that it has a good stability against aging and a good re-adhesion of the adhesive layer after sticking to the coat as well, and have accomplished the present invention.

Thus, the present invention provides a lowly-adhesive coating material which comprises 99 to 33% by weight of a fluorine-containing acrylic polymer prepared from a monomer composition mainly comprising acrylate or methacrylate having a $C_{6-16}$ perfluoroalkyl group and 1 to 67% by weight of a fluorine-type oil.

The present invention also provides a releasing liner for an adhesive material which comprises a substrate and a coat of the lowly-adhesive coating material of the present invention provided on one or both surfaces of the substrate, and it further provides an adhesive tape which comprises a substrate, an adhesive layer provided on one surface of the substrate, and a coat of the lowly-adhesive coating material of the present invention provided on the other surface of the substrate.

In the lowly-adhesive coating material of the present invention, the fluorine-containing acrylic polymer shows an appropriate compatibility to the fluorine-type oil because of a good balance between the common point in view of the constituting element that the fluorine-containing acrylic polymer and the fluorine-type oil both are of a fluorine-type and the different point in view of the structure that the polymer is an acrylic type while the fluorine-type oil is usually an ether or of a vinyl type. As a result, it does not happen that the fluorine-containing acrylic polymer and the fluorine-type oil do not form a uniform coat due to too poor compatibility therebetween to cause a clear phase separation therebetween and also that they rather form a completely united coat due to too good compatibility therebetween. The lowly-adhesive coating material of the present invention has a property that the fluorine-containing acrylic polymer is homogeneously plasticized (softened) by the fluorine-type oil and, at the same time, a part of the fluorine-type oil is oozed out to the surface of the coat (bleeding).

It has been known that, with respect to the surface shape (morphology) of the fluorine-containing acrylic polymer, orientation of the perfluoroalkyl groups to the surface is usually preferred for making the releasing force light. The coat formed by the lowly-adhesive coating material of the present invention is, as mentioned above, plasticized (softened) whereby the molecules are easily movable and the surface shape as such is apt to be resulted. In addition, formation of such a surface shape is accelerated by a fluorine-type oil in a state of bleeding and, after such a surface shape is formed, that shape is fixed and stabilized by the fluorine-type oil in a state of bleeding. Accordingly, the coat formed from the lowly-adhesive coating material of the present invention shows a light releasing property to the adhesive layer.

Other objects and features of the present invention will be described or become apparent from the following disclosure.

DETAILED DESCRIPTION OF THE INVENTION

The present invention will now be further illustrated as hereunder.

The lowly-adhesive coating material of the present invention comprises a specific fluorine-containing acrylic polymer and a fluorine-type oil.

The fluorine-containing acrylic polymer is a polymer which is prepared by polymerization of a monomer composition mainly comprising acrylate having a perfluoroalkyl group or methacrylate having a perfluoroalkyl group (hereinafter, they will be referred to as "fluorine-type long-chain alkyl acrylate monomer") in which the main chain is produced by an acrylic polymerization.

Accordingly the fluorine-type long-chain alkyl acrylate monomer is acrylate or methacrylate having a perfluoroalkyl group represented by the following formula (1) or (2), respectively.

Rf—X—OCOCH=CH$_2$    (1)

Rf—X—OCOC(CH$_3$)=CH$_2$    (2)

(In the formulae (1) and (2), Rf is a perfluoroalkyl group and X is a spacer group.)

The number of carbons of the perfluoroalkyl group (Rf) are 6 to 16 and, in order to achieve a light releasing property of not more than 2 N/dm, it is more preferred that it ranges from 8 to 12. When the number of carbons is less than 6, the releasing property of the coating material is not sufficiently available, while when it is more than 16, the cost for purchasing the monomer itself significantly increases and the polymer having the characteristics corresponding therewith is hardly produced.

Specific examples of the perfluoroalkyl group (Rf) may include a linear perfluoroalkyl group represented by the formula (3), a perfluoroalkyl group represented by the formula (4) where one of fluorine atoms on the α-carbon atom is substituted with a hydrogen atom, and a branched perfluoroalkyl group represented by the formula (5).

CF$_3$(CF$_2$)$_n$—    (3)

HCF$_2$(CF$_2$)$_n$—    (4)

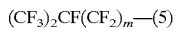

(CF$_3$)$_2$CF(CF$_2$)$_m$—    (5)

(In the formulae, n is an integer of 5 to 15 and m is an integer of 3 to 12.)

There is no particular limitation for the spacer group (X) in the formulae (1) and (2). As the spacer groups, those utilized in commonly available monomers may be utilized, and examples thereof may include a methine group or an ethylene group of the formula (6), a hydroxypropyl group of the formula (7) and an N-alkylsulfamide group of the formula (8).

—(CH$_2$)$_p$—    (6)

—CH$_2$CH(OH)CH$_2$—    (7)

—SO$_2$N(C$_q$H$_{2q+1}$)—CH$_2$CH$_2$—    (8)

(In the formula (6), p is an integer of 1 or 2 and, in the formula (8), q is an integer of 2, 3 or 4.)

In the present invention, the more the proportion of the fluorine-type long-chain alkyl acrylate monomer in the monomer composition, the better. Thus, the proportion is preferably not less than 75% by weight or, more preferably, not less than 90% by weight. In view of the releasing property, all of the constituting monomers in the monomer composition may be the fluorine-type long-chain alkyl acrylate monomer.

In the monomer composition, monomers other than the fluorine-type long-chain alkyl acrytate monomer may be mixed. As a result thereof, it is possible to improve the adhesion of the coat to the substrate such as PET, to enhance the cohesive force of the fluorine-containing acrylic polymer or to adjust the polarity (such as solubility in a solvent, SP value, compatibility with a fluorine-type oil, etc.). For example, a homopolymer of a fluorine-type long-chain alkyl acrylate monomer having 10 or more carbon atoms is hardly soluble even in a fluorine-type solvent, but it is possible to improve the solubility when another monomer is copolymerized therewith.

There is no particular limitation for the monomer which can be copolymerized with a fluorine-type long-chain alkyl acrylate monomer. As the monomer, commonly-used monomers such as alkyl ester of methacrylic acid or acrylic acid, styrene, vinyl acetate and acrylonitrile may be used. However, in view of a releasing property, it is preferred to use another fluorine-type monomer such as a fluorine-type short-chain C$_{1-5}$ alkyl acrylate monomer or the like.

With regard to a polymerizing method for the production of the fluorine-containing acrylic polymer in the present invention, the above-mentioned monomer composition can be polymerized by a known radical polymerization. In that case, common and known emulsion polymerization, suspension polymerization, bulk polymerization or solution polymerization may be utilized as the mode of polymerization. When most of the monomer composition is occupied by a fluorine-type long-chain alkyl acrylate monomer, a method where a solution polymerization is carried out using an initiator such as AIBN in the presence of a fluorine-type solvent may be utilized. Alternatively, a method where a monomer is made into a suspended and dispersed state in a high concentration using a small amount of a commonly-used solvent (such as ethyl acetate) is effective as well. When a monomer other than the fluorine-type long-chain alkyl acrylate monomer is copolymerized, it is also possible to conduct a solution polymerization in a commonly-used solvent (such as ethyl acetate).

There is no particular need to always cross-link the fluorine-containing acrylic polymer. When cross-linked, it is possible to compound much more fluorine-type oil with the lowly-adhesive coating material of the present invention, whereby the releasing force to the adhesive layer can be made light. Further, as a result of cross-linking, it is possible to improve the cohesive force of the coat whereby the adhesive property of the coat to the substrate can be improved.

Examples of the applicable cross-linking method include a method where a reactive group such as a hydroxyl group, a carboxyl group, a glycidyl group or an alkoxysilane group is previously introduced into a fluorine-containing acrylic polymer and then a cross-linking agent which is reactive therewith is introduced thereinto for forming a bond; a method where two reactive groups which are reactive each other are introduced into a fluorine-containing acrylic polymer (either into different molecules or into the same molecule at the same time) and then the reaction is accelerated by adding a catalyst thereto for forming a bond; and a method where a self-cross-linking reactive group is introduced and then the reaction is accelerated by adding a catalyst thereto for forming a bond.

With regard to a method for introducing a reactive group or a polar group into the fluorine-containing acrylic polymer, it is an easy, convenient and effective method to copolymerize a monomer containing a reactive group represented by HEMA (hydroxyethyl methacrylate), HEA (hydroxyethyl acrylate), methacrylic acid, acrylic acid, GMA (glycidyl methacrylate), isocyanatoethyl methacrylate, alkoxysilane-containing acrylate, alkoxysilane-containing methacrylate, etc. with the fluorine-type long-chain alkyl acrylate monomer.

When the monomer which constitutes the monomer composition is a fluorine-type long-chain alkyl acrylate monomer only, a method for introducing a reactive group into the polymer is that a fluorine-type monomer having a spacer having a functional group such as a hydroxypropyl group is used in an appropriate amount together with the fluorine-type long-chain alkyl acrylate monomer.

The fluorine-type oil used in the present invention is a fluorine-type compound which has substantially no boiling point in an atmospheric pressure, has a vapor pressure at room temperature of $10^{-2}$ Torr or less, and is liquid at room temperature or has a pour point of not higher than room temperature.

Examples of the fluorine-type oil applicable include a perfluoropolyether oil, a polymer with a relatively low polymerization degree of trifluorinated ethylene chloride represented by the formula (9)

$$—(CF_2CFCl)_n— \tag{9}$$

(Daifloil manufactured by Daikin Industries), a fluorine-type surface-active agent and perfluoroalkyl phosphate. Among them, such a perfluoropolyether oil is particularly preferred.

With regard to the perfluoropolyether oil, those having no functional group as shown by the formulae (10), (11), (12) and (13) and those having functional groups as shown by the formulae (14) and (15) are commercially available and any of them may be used.

$$F(CF_2CF_2CF_2O)_nCF_2CF_3 \tag{10}$$

(Demnum manufactured by Daikin Industries)

$$C_3F_7O(CF(CF_3)CF_2O)_nCF_2CF_3 \tag{11}$$

(Krytox GPL, Krytox 143 and Krytox VPF manufactured by E. I. Dupont de Nemours and Company)

$$CF_3—(OCF(CF_3)CF_2)_n—(OCF_2)_m—OCF_3 \tag{12}$$

(Fomblin Y, GALDEN manufactured by Ausimont)

$$CF_3—(OCF_2CF_2)_n—(OCF_2)_m—OCF_3 \tag{13}$$

(Fomblin Z and Fomblin M manufactured by Ausimont)

$$X—CF_2—(OCF_2CF_2)_n—(OCF_2)_m—OCF_2—X \tag{14}$$

(Fomblin Z derivatives manufactured by Ausimont, where X is COOH, CH$_2$OH, CH$_2$OCH$_2$CH(OH)CH$_2$OH, CH$_2$(OCH$_2$CH$_2$)$_n$—OH, COOR, etc.)

$$CF_3—(OCF(CF_3)CF_2)_n—(OCF_2)_m—Y \tag{15}$$

(GALDEN MF series manufactured by Ausimont, where Y is a group containing a functional group such as carboxylic acid, phosphate, alcohol, amidosilane and alkylamide)

In the lowly-adhesive coating material of the present invention, it is preferred that the fluorine-type oil is adjusted to such an extent that the oil is appropriately bled from the coat. Too much bleeding will badly affect the re-adhesion of the adhesive layer after the layer is stuck to the coat.

Adjustment of the bleeding can be carried out by an appropriate selection of the type and the molecular weight of perfluoropolyether which is used as a fluorine-type oil. Thus, among the perfluoropolyether, that which has a functional group shows less bleeding than that which has no functional group. In addition, that having a low molecular weight shows less bleeding than that having a high molecular weight. However, when a perfluoropolyether having a functional group is used in the presence of a cross-linking agent, it should be taken care to prevent the reaction of this functional group with the cross-linking agent so that perfluoropolyether is not resinified. Accordingly, it is preferred to design in such a manner that the cross-linking agent reacts with the functional group of the fluorine-containing acrylic polymer in preference to the functional group of the perfluoropolyether.

In the lowly-adhesive coating material of the present invention, it is preferred that the compounding ratio of the fluorine-containing acrylic polymer to the fluorine-type oil is 99 to 33% by weight of the former to 1 to 67% by weight of the latter or it is more preferred that the ratio is 95 to 67% by weight of the former to 5 to 33% by weight of the latter. Although it is possible to make the releasing force lighter by increasing the amount of the fluorine-type oil, the re-adhesive property tends to lower. In addition, the fluorine-type oil is expensive as compared with the fluorine-containing acrylic polymer and, therefore, too much compounding of the fluorine-type oil makes the manufacturing cost of the coating material of the present invention high.

The lowly-adhesive coating material of the present invention may contain a solvent so that viscosity and film thickness upon coating are appropriately adjusted. With regard to the solvent therefor, that which is able to dissolve the fluorine-containing acrylic polymer and the fluorine-type oil at the same time is preferred and its suitable example is a fluorine-type solvent. Specific examples of the fluorine-type solvent include perfluoroalkanes (PF series, 3M), perfluoropolyethers with a low-molecular weight (GALDEN, Ausimont), trifluorobenzene, hexafluoroxylene, perfluoroalkyl tetrahydrofuran and a mixture thereof. In addition, commonly-used solvents which are other than the fluorine-type solvent may be used as well provided that the fluorine-containing acrylic polymer is a copolymer which is soluble in the commonly-used solvents and also that the fluorine-type oil is soluble in the commonly-used solvents (such as Daifloil manufactured by Daikin Industries).

It is also possible that the lowly-adhesive coating material of the present invention is compounded with an appropriate amount of a filler for coloring or for making the surface rough within such an extent that the releasing property is not deteriorated. Examples of filler with which the coating material can be compounded are common inorganic fillers, carbon particles, pigments, fine particles of fluororesins such as PTFE (polytetrafluoroethylene) and fluorinated carbon.

It is preferred that the concentration of the lowly-adhesive coating material of the present invention is in such an extent that a dry coat having a thickness of from 10 nm to 10 $\mu$m can be formed on the substrate. When thickness of the dry coat is less than 10 nm, the releasing property tends to become inferior while, when it is more than 10 $\mu$m, the cost is high and the adhesive property to the substrate tends to become low. Concentration of the coating material for making the thickness of the dry coat within a range of 10 nm to 10 $\mu$m can be decided from the wet weight of the coating material applied by the coater and the dry weight of the desired coating coat.

The lowly-adhesive coating material of the present invention can be utilized for a releasing liner of an adhesive tape, for a releasing treatment of the backside of a single-sided adhesive tape, for a soil-preventing treatment for substrates such as a glass epoxy substrate and various electric and electronic parts, for an oil barrier treatment of precision instrument parts, and for water- and oil-repelling treatment. With an object of soil-preventing treatment, the coating material is particularly effective as a coating material in the case of formation of a coat etc. for precision electronic instruments which are requested not to contain silicone therein.

To be more specific, in the case of formation of a releasing liner for adhesive materials, for example, the lowly-adhesive coating material of the present invention is coated on the substrate and then dried to form a coat thereof on the surface of the substrate, while in the case of a single-sided adhesive tape where the releasing treatment is carried out on its backside, the lowly-adhesive coating material of the present invention is coated on one surface of the substrate where the one surface is an opposite surface to the adhesive layer surface of the adhesive tape constituted of the substrate and the adhesive layer provided thereon, and then dried to form a coat of the lowly-adhesive coating material.

Suitable examples of the substrate include a polyester film, a polyolefin film, a polyamide film, a polyimide film, polyolefin-laminated paper, paper where permeation of solvents is suppressed (parchment paper, glassine paper and sealer-coated paper), films on which metal is vapor deposited, and metal foil. With regard to a coating apparatus, common coaters such as roll coater, knife coater, pipe coater and gravure coater may be used.

When the coat of the lowly-adhesive coating material of the present invention is formed for the purpose of soil-preventing treatment, oil barrier treatment, water-and oil-repelling treatment, etc. for various kinds of electric and electronic parts, substrates, precision instrument parts, etc., it is also possible to carry out the coating by means of dipping, brushing, spraying, etc. in addition to the above-mentioned means using a coater.

With regard to the drying condition after the lowly-adhesive coating material of the present invention is coated onto a substrate, there is no particular necessity of heating so far as a coat is able to be formed. When formation of the coat is disturbed by dew drops, drying in an oven at around 60 to 120° C. may be adopted. When a cross-linking reaction is carried out, a thermal treatment after drying at the temperature of the reaction condition may be adopted.

EXAMPLES

The present invention will now be more specifically illustrated by way of the following examples.

Examples 1 to 4

(1) Synthesis of Fluorine-containing Acrylic Polymer A

Into a one-liter flask equipped with a stirring device and a reflux condenser were charged 200 g of perfluorooctylethyl methacrylate ($CH_2$=$C(CH_3)COOCH_2CH_2C_8F_{17}$) and 50 g of ethyl acetate, followed by heating up to 80° C. in a nitrogen atmosphere. Then 0.6 g of azobisisobutyro-nitrile (AIBN) was dissolved in 6 g of MEK. The AIBN solution was added to the reaction system and the polymerization was initiated. The polymerization proceeded in a semi-suspended state being separated into two layers, i.e. upper and lower layers. After 4 hours, the reaction was stopped and the reaction mixture was cooled and allowed to stand for a whole day and night. A phase separation into 245 g of a waxy polymer layer (lower layer) and 5 g of a solvent layer (upper layer) was resulted. The polymer layer was taken out from the flask and disintegrated and ethyl acetate was evaporated therefrom to give a powdery fluorine-containing acrylic polymer A.

(2) Preparation of Lowly-adhesive Coating Material

The fluorine-containing acrylic polymer A (1 g) obtained in (1) was dissolved in 90 g of an FR thinner (a mixture of perfluoro-2-butyltetrahydrofuran, m-xylene hexafluoride and perfluoroalkane; manufactured by Shin-etsu Chemical Industries). Into this solution was dissolved a perfluoropolyether oil (Fomblin Z derivative DIAC 4000 manufactured by Ausimont; a type where both terminal carboxylic acids are modified; molecular weight: 4000) in varied amounts of from 0.1 g to 1.5 g.

(3) Preparation of Releasing Liner

The coating material obtained in (2) was applied in an amount of about 8 g/m$^2$ using a wire rod (No. 5) on a polyethylene terephthalate film having a thickness of 50 $\mu$m which was previously subjected to a corona treatment and then dried at 110° C. for 5 minutes to give a releasing liner.

(4) Evaluations

The coated surface of the releasing liner obtained in (3) was stuck to a double-sided adhesive tape of an acrylic type (T-3500 manufactured by Sony Chemicals Corp.) and pressed by passing through a silicone roll with a linear pressure of 2.4 kg/cm. Thereafter, it was cut into a size of 5 cm×20 cm, applied with a load of 2.5 kg and aged in an oven at 70 for 24 hours. It was then returned to room temperature and the releasing force (calculated in terms of a width in dm) was measured using a tensile tester of a Tensilon type at the rate of 300 cm/min in a releasing mode of a T type.

Immediately after the releasing, a new polyethylene terephthalate film of a thickness of 50 μm was stuck to the releasing side of the adhesive tape and pressed by passing through a silicone roll with a linear pressure of 2.4 kg/cm. This was cut into a width of 2 cm and its releasing force was measured using a tensile tester of a Tensilon type at the rate of 300 cm/min in a releasing mode of a T type and defined as a re-adhesive force (calculated in terms of a width in dm).

In the meanwhile, the re-adhesive force of the adhesive tape (T-3500 manufactured by Sony Chemicals Corp.) after being stuck to the releasing paper of a silicone type to the polyethylene terephthalate film was measured by the same manner as above. The result was that the re-adhesive force was 21.6 N/dm. Then, the ratio of the already-mentioned re-adhesive force of the adhesive tape after being stuck to the releasing liner to the value obtained herein was calculated.

Incidentally, 30 ml of the coating material obtained in (2) was poured into an aluminum cup and evaporated to is dryness in an oven at 110° C. and compatibility of the fluorine-containing acrylic polymer A with the fluorine-type oil (perfluoropolyether oil) and degree of the bleeding were checked from the appearance and feel by fingering of the resulting coat.

The results are shown in Table 1. Table 1 shows that the releasing force of the products of Examples 1 to 4 was not more than 2 N/dm and the re-adhesive force thereof was good as well. The appearance of the dried coat was transparent and soft and compatibility of the fluorine-containing acrylic polymer A with the fluorine-type oil was considerably good. Bleeding on the surface of the fluorine-type oil was noted only a little.

Comparative Example 1

The same fluorine-containing polymer A as in Examples 1 to 4 was used to prepare a releasing liner by the same manner as in the Examples except that the fluorine-type oil was not mixed therewith and an evaluation was conducted. The results are shown in Table 1.

The releasing force after aging was 2.06 N/dm and, for achieving a light releasing force of not more than 2 N/dm, the resulting releasing force was inferior a little. The releasing mode was that where the tendency of stick-slip was strong.

Comparative Example 2

The same operation as in the above Examples was carried out using the same fluorine-containing acrylic polymer A as in the Examples except that the compounding amount of the fluorine-type oil was made three-fold of the amount of the fluorine-containing acrylic polymer whereupon a releasing liner was prepared and evaluated. The results are shown in Table 1.

The surface of the resulting releasing liner was sticky and, although the releasing force after aging was sufficiently light, the re-adhesive force was apparently bad and the pollution by transfer of the releasing liner to the adhesive side of the adhesive tape was big. In addition, the form of this dried coat was of a fluid liquid of a high viscosity. Thus, it is now noted that, when the compounding amount of the fluorine-type oil is too much, the polymer causes a cohesion failure.

TABLE 1

|  | Examples | | | | Comparative Examples | |
| --- | --- | --- | --- | --- | --- | --- |
|  | 1 | 2 | 3 | 4 | 1 | 2 |
| Fluorine-containing acrylic polymer A (g) | 1.00 | 1.00 | 1.00 | 1.00 | 1.00 | 1.00 |
| Fluorine-type oil (g) | 0.10 | 0.25 | 0.62 | 1.5 | — | 3.00 |
| Releasing force after aging (N/dm) | 1.27 | 0.88 | 0.63 | 1.26 | 2.06 | 0.49 |
| Re-adhesive force (N/dm) | 25.3 | 22.8 | 17.2 | 13.7 | 27.7 | 7.30 |
| Re-adhesive force ratio to silicone type releasing paper (%) | 117 | 106 | 79.6 | 63.4 | 128 | 33.8 |
| Appearance of dried coat*[1] | A | A | B | C | D | E |
| Bleeding*[2] | a | a | a | b | c | — |

Notes for Table 1:
*[1]A: transparent and a little soft
B: transparent and soft
C: transparent and very soft
D: transparent and fragile/hard
E: transparent and sticky flowing liquid having a high viscosity (degree of hardness: E < C < B < A < D)
*[2]a: only a little
b: a little
c: none Examples 5 to 8

One gram of the same fluorine-containing acrylic polymer A as used in the above Examples was dissolved in 90 g of an FR thinner and, as shown in Table 2, 0.25 g of the fluorine-type oil having no functional group was compounded with each of them, followed by dissolving to prepare the coating materials.

The resulting coating materials were subjected to measurement of the releasing force and the re-adhesive force by the same manner as in the above-mentioned Examples. The appearance and bleeding of the dry coat were checked as well. The result is shown in Table 2.

With respect to the compatibility of the fluorine-containing acrylic polymer A with the fluorine-type oil in Examples 5, 7 and 8, all of the coats became somewhat soft filmy and the bleeding was small. In addition, both releasing force and re-adhesive force of them were good. In Example 6 where a fluorine-type oil having a high molecular weight was used, the coat was not completely transparent, the compatibility was somewhat low and the bleeding was somewhat large although both releasing force and re-adhesive force were good. Incidentally, the opaqueness of the coat of Example 8 was due to addition of fine powder of PTFE.

TABLE 2

| | Examples | | | |
|---|---|---|---|---|
| | 5 | 6 | 7 | 8 |
| Fluorine-type oil (g) | Krytox 1506*¹ | Krytox 1525*¹ | Daifloil No. 20*² | Demnam GreaseL-65*³ |
| Compounding ratio of the polymer A to fluorine-type oil | 1/0.25 | 1/0.25 | 1/0.25 | 1/0.25 |
| Releasing force after aging (N/dm) | 1.4 | 1.1 | 1.7 | 1.1 |
| Re-adhesive force (N/dm) | 30.6 | 29.4 | 29.4 | 29.4 |
| Appearance of dried coat*⁴ | A | A" | A | A' |
| Bleeding*⁵ | a | b | a | a |

Notes for Table 2:
*¹: manufactured by E. I. Dupont de Nemours and Company
*²: manufactured by Daikin Industries
*³: manufactured by Daikin Industries; containing 35% by weight of PTFE fine powder
*⁴A: transparent and a little soft
A': opaque and somewhat soft
A": opaque and a little soft (degree of softness: A > A' > A")
*⁵a: a little
b: somewhat much Examples 9 to 11

Into a one-liter flask equipped with a stirring device and a reflux condenser were charged perfluorooctylethyl methacrylate ($CH_2$=$C(CH_3)COOCH_2CH_2C_8F_{17}$) and HEMA (hydroxyethyl methacrylate) in an amount of 100 g in total in a ratio as shown in Table 3, then 42 g of ethyl acetate was added thereto and they were subjected to polymerization by the same manner as in Example 1 to give fluorine-containing acrylic polymers B, C and D. Then 1 g of each of them was dissolved in 90 g of an FR thinner and then 0.25 g of a fluorine-type oil (Fomblin Z derivative DIAC 4000 manufactured by Ausimont) was further dissolved therein to give a coating material.

The coating material was evaluated by the same method as in Example 1. The results are shown in Table 3. As shown in Table 3, compatibility of the fluorine-containing acrylic polymers B, C and D with the fluorine-type oil was relatively good in all cases and bleeding was only a little as well. Releasing property was noted to tend to be deteriorated as the amount of HEMA increased.

Example 12

The same operation as in Example 11 was carried out except that 2 g of γ-methacryloxypropyl trimethoxysilane was used in place of HEMA to give a fluorine-containing acrylic polymer E. Then 1 g of the said polymer was dissolved in 90 g of an FR thinner and 0.25 of a fluorine-type oil (Fomblin Z derivative DIAC 4000; manufactured by Ausimont) was compounded therewith and dissolved therein. Perfluorooctyl phosphate (0.02 g) was added as a catalyst to give a coating material of this Example.

The resulting coating material was evaluated by the same method as in Example 1. The results are shown in Table 3.

The compatibility of this polymer E with the fluorine-type oil was relatively good and bleeding was only a little too. Releasing property was good.

TABLE 3

| | Examples | | | |
|---|---|---|---|---|
| | 9 | 10 | 11 | 12 |
| Fluorine-containing acrylic polymer | B | C | D | E |
| Ratio of FMA*¹ to the copolymerizing monomer | 98.7/1.3*² | 96.0/4.0*² | 93.9/6.1*² | 98.0/2.0*³ |
| Compounding ratio of the polymer to fluorine-type oil | 1/0.25 | 1/0.25 | 1/0.25 | 1/0.25 |
| Releasing force after aging (N/dm) | 1.6 | 4.9 | 8.6 | 1.0 |
| Re-adhesive force (N/dm) | 22.5 | 26.5 | 29.4 | 29.4 |
| Appearance of dried coat*⁴ | A | A | A | A |
| Bleeding*⁵ | a | a | a | a |

Notes for Table 3:
*¹: FMA (perfluorooctylethyl methacrylate)
*²: HEMA (hydroxyethyl methacrylate)
*³: ASMA (γ-methacryloxypropyl trimethoxysilane)
*⁴A: transparent and a little soft
*⁵a: only a little Comparative Examples 3 to 6

Each 1 g of the fluorine-containing acrylic polymers B to E of the above Examples 9 to 12 was dissolved in 90 g of an FR thinner to give a coating material to which no fluorine-type oil was added. The resulting coating materials were evaluated by the same manner as in Example 1. The results are shown in Table 4.

The releasing property of coats of the coating materials of Comparative Examples 3 to 6 was heavier than that in the case of the corresponding Examples 9 to 12 to which fluorine-type oil was added.

TABLE 4

| | Comparative Examples | | | |
|---|---|---|---|---|
| | 3 | 4 | 5 | 6 |
| Fluorine-containing acrylic polymer | B | C | D | E |
| Ratio of FMA*¹ to the copolymerizing monomer | 98.7/1.3*² | 96.0/4.0*² | 93.9/6.1*² | 98.0/2.0*³ |
| Compounding ratio of the polymer to fluorine-type oil | no F-type oil added | ← | ← | ← |
| Releasing force after aging (N/dm) | 2.2 | 6.1 | 9.0 | 2.1 |
| Re-adhesive force (N/dm) | 28.4 | 29.4 | 30.6 | >30.6 |
| Appearance of dried coat*⁴ | F | F | F | F |

Notes for Table 4:
*¹: FMA (perfluorooctylethyl methacrylate)
*²: HEMA (hydroxyethyl methacrylate)
*³: ASMA (γ-methacryloxypropyl trimethoxysilane)
*⁴F: hard resin-like

Examples 13 to 14

Into a one-liter flask equipped with a stirring device and a reflux condenser were charged 25 g of 2-(perfluoro-7-methyloctyl)ethyl methacrylate ($CH_2=C(CH_3)COOCH_2CH_2(CF_2)_6CF(CF_3)_2$) (M-3820 manufactured by Daikin Fine Chemicals) and 15 g of ethyl acetate and the mixture was heated up to 80 in a nitrogen atmosphere. Thereafter, 0.08 g of azobisisobutyronitrile (AIBN) dissolved in 1 g of MEK was added to the reaction system to start the polymerization. Since reaction mixture solidified after 7 hours, 40 ml of ethyl acetate was added. The reaction mixture was separated into two layers. The lower layer (polymer layer) was taken out and dried to give a fluorine-containing acrylic polymer F.

The same operation was carried out except that 2-(perfluoro-9-methyldecyl)ethyl methacrylate ($CH_2=C(CH_3)COOCH_2CH_2(CF_2)_8CF(CF_3)_2$) (M-4020 manufactured by Daikin Fine Chemicals) was used as an acrylic monomer to give a fluorine-containing acrylic polymer G.

Each 1 g of the polymers F and G was dissolved in 90 g of an FR thinner, 0.33 g of perfluoropolyether of Ausimont (Fomblin M 60; average molecular weight: 12,500) was added as a fluorine-type oil and the resulting coating material was evaluated by the same manner as in Example 1. The results are shown in Table 5.

The coats of those Examples exhibited good releasing force. The compatibility of the fluorine-containing acrylic polymers F and G with the fluorine-type oil was somewhat low and bleeding was somewhat much. However, their re-adhesive property was good

Comparative Examples 7 to 8

The same operations as in the above Examples 13 to 14 were carried out except that no fluorine-type oil was compounded to prepare coating materials and they were evaluated. The results are shown in Table 5.

The releasing force of the coats of those Comparative Examples 7 to 8 was heavier than the corresponding ones of Examples 13 to 14 where the fluorine-type oil was compounded. In Comparative Example 8, its releasing mode showed a strong tendency of stick-slip.

TABLE 5

|  | Examples | | Comparative Examples | |
| --- | --- | --- | --- | --- |
|  | 13 | 14 | 7 | 8 |
| Fluorine-containing acrylic polymer | F | G | F | G |
| Compounding ratio of the polymer to fluorine-type oil | 1/0.33 | 1/0.33 | not added | not added |
| Releasing force after aging (N/dm) | 2.9 | 1.1 | 5.1 | 2.0*1 |
| Re-adhesive force (N/dm) | 30.4 | 28.9 | 27.4 | 28.4 |
| Appearance of dried coat*2 | A" | A" | — | — |
| Bleeding*3 | d | d | — | — |

Notes for Table 5:
*1: strong tendency of stick-slip
*2A": opaque and slightly soft
*3d: somewhat much According to the lowly-adhesive coating material of the present invention, a coat of a non-silicone type can be easily formed merely by means of applying the coating material on a substrate followed by drying and, in addition, the coat shows a sufficient adhesion to the substrate, while to an adhesive layer such as an acrylic pressure-sensitive adhesive material or the like, it shows medium to light releasing force. Further, the stability of releasing force after aging is good and, furthermore, the adhesive layer, after having been stuck to the coat of the coating material of the present invention, shows good re-adhesive property.

The entire disclosure of the specification, claims and summary of Japanese Patent Application No. 10-254349 filed Sep. 8, 1998 is hereby incorporated by the reference.

What is claimed is:

1. A process for preparing a lowly-adhesive coating material, comprising:
    dissolving 99 to 33% by weight of a fluorine-containing acrylic polymer having a self-cross-linking reactive group and 1 to 67% by weight of a fluorine oil into a fluorine solvent in which said fluorine-containing acrylic polymer and said fluorine oil can are simultaneously soluble, wherein said fluorine-containing acrylic polymer is prepared by copolymerizing a γ-methacryloxypropyl trimethoxysilane having a self-cross-linking reactive group with an acrylic or a methacrylate having a $C_6$–$C_{16}$ perfluoroalkyl group; and
    adding a catalyst for catalyzing a self-cross-linking reaction to the resulting solution.

2. The process according to claim 1, wherein said fluorine-containing acrylic polymer is prepared from a monomer composition containing 75% or more by weight of acrylic or methacrylate having a $C_8$–$C_{12}$ perfluoroalkyl group.

3. The process according to claim 2, wherein said fluorine-containing acrylic polymer is prepared from a monomer composition containing 90% or more by weight of acrylic or methacrylate having a $C_8$–$C_{12}$ perfluoroalkyl group.

* * * * *